United States Patent [19]

Ito et al.

[11] Patent Number: 5,304,623
[45] Date of Patent: Apr. 19, 1994

[54] ONE-PACK TYPE HEAT PRECURABLE MOISTURE-CURING SEALANT COMPOSITION COMPRISING ISOCYANATE CONTAINING COMPONENT AND SILOXANE CONTAINING POLYOL

[75] Inventors: Masahiro Ito, Mishima; Yoshihiro Nakata, Takatsuki; Yukio Hayashi, Kyoto, all of Japan

[73] Assignee: Sunstar Giken Kabushiki Kaisha, Osaka, Japan

[21] Appl. No.: 3,814

[22] Filed: Jan. 8, 1993

Related U.S. Application Data

[63] Continuation of Ser. No. 850,298, Mar. 12, 1992, abandoned.

[30] Foreign Application Priority Data

Mar. 29, 1991 [JP] Japan .................................. 3-066068

[51] Int. Cl.$^5$ .......................... C08G 18/10; C08G 18/80
[52] U.S. Cl. ........................................ 528/28; 525/123; 525/124; 525/127; 525/128
[58] Field of Search ............... 525/123, 124, 127, 128; 528/28

[56] References Cited

U.S. PATENT DOCUMENTS 4,847,321 7/1989 Hess et al. ............................ 524/788
5,061,749 10/1991 Ito et al. ............................... 525/123

FOREIGN PATENT DOCUMENTS 3-250016 11/1991 Japan .................................. 525/127

*Primary Examiner*—John Kight, III
*Assistant Examiner*—R. Johnson
*Attorney, Agent, or Firm*—Wegner, Cantor, Mueller & Player

[57] ABSTRACT

One-pack type heat precurable moisture-curing sealant composition which comprises as the main component:
- (A) a urethane prepolymer having a content of an active free isocyanate group (NCO) of 1 to 6 % by weight which is prepared by reacting a polyol and an excess amount of an aromatic polyisocyanate compound,
- (B) a vinyl polymer containing a siloxy group and having a number average molecular weight of 3,000 to 30,000, and
- (C) a partially inactivated solid polyisocyanate compound, which can be precured at a comparatively lower temperature within a short period of time and cured with moisture in air, is useful for adhering various parts in automobiles and the construction industries without temporary holding means.

20 Claims, No Drawings

ONE-PACK TYPE HEAT PRECURABLE MOISTURE-CURING SEALANT COMPOSITION COMPRISING ISOCYANATE CONTAINING COMPONENT AND SILOXANE CONTAINING POLYOL

This application is a continuation of U.S. application Ser. No. 07/850,298 filed Mar. 12, 1992, now abandoned.

This invention relates to a one-pack type heat precurable moisture-curing sealant composition, more particularly to a one-pack type urethane sealant composition comprising (A) a urethane prepolymer containing a specific amount of an active free isocyanate group, (B) a vinyl polymer containing a siloxy group in a molecule and having a number average molecular weight of 3,000 to 30,000, and (C) a partially inactivated solid polyisocyanate compound, which can be cured by practical steps. That is, the composition can be cured with moisture and/or by heating at 80° C. or higher, for example, partially cured by heating at a temperature of 80° to 100° C. for 5 to 10 minutes to exhibit an initial adhesive strength and then wholly cured with moisture. The term "sealant" in this invention includes also "an adhesive".

PRIOR ART

Recently technology has been progressing rapidly for adhering window glass and some parts around windows in the production line of automobiles, and with the progress of such technology, the substrates to be adhered with glass are partially changed from coated steel panels to plastic substrates.

Under the circumstances, the sealant (or the adhesive) has been required to be precurable at room temperature or at a comparatively lower temperature, particularly to react rapidly and precure at least partially within a short period of time in order to also provide a temporary holding effect. For such a demand, there have been proposed two-pack type sealants comprising a polyol and a urethane prepolymer, and one-pack type moisture-curing sealants comprising a combination of a urethane prepolymer and various amine or metallic catalysts. However, the former two-pack type sealants have less workability which causes a decrease in the demand thereof, and the latter one-pack type moisture-curing sealants do not have sufficient curing speed. It has also been proposed to block the active free NCO group of a urethane prepolymer to prepare a one-pack type thermosetting sealant, but the blocking agent used therefor has a high dissociation temperature and hence the sealant can not be cured at a low temperature.

BRIEF DESCRIPTION OF THE INVENTION

The present inventors have intensively studied to find an improved one-pack type low temperature heat precurable moisture-curing sealant having satisfactory properties and have found that when a combination of a specific urethane prepolymer and a vinyl polymer containing a hydrolyzable siloxy group and further a partially inactivated solid polyisocyanate compound is used as the main component, there can be obtained the desired heat precurable moisture-curing sealant which can be precured by heating at a comparatively lower temperature and then cured with moisture. That is, it has been found that in such a sealant composition the siloxy group of the vinyl polymer is hydrolyzed with moisture in air to produce a hydroxy group, and on the other hand, the partially inactivated solid polyisocyanate compound is activated by heating at 80° to 100° C. and reacts with the above hydroxy group of the vinyl polymer to exhibit the initial adhesive strength. Further, the hydroxy group of the vinyl polymer is reacted with the active free isocyanate group of the urethane prepolymer to give partial curing of the composition, and then the remaining active free isocyanate group is reacted with moisture in air whereby the composition is wholly cured. Besides, the composition of the invention has an excellent storage stability.

An object of the invention is to provide an improved one-pack type heat precurable moisture-curing sealant which is precurable at a comparatively lower temperature within a short period of time and has excellent initial adhesion force and excellent storage stability. Another object of the invention is to provide a one-pack type heat precurable moisture-curing sealant comprising a urethane prepolymer containing an active free isocyanate group, a vinyl polymer containing a hydrolyzable siloxy group and a partially inactivated solid polyisocyanate compound. These and other objects and advantages of the invention will be apparent to those skilled in the art from the following description.

DETAILED DESCRIPTION OF THE INVENTION

The invention provides a one-pack type heat precurable moisture-curing sealant composition which comprises as the main component:

(A) a urethane prepolymer having a content of an active free isocyanate group (NCO) of 1 to 6 % by weight which is prepared by reacting a polyol and an excess amount of a polyisocyanate compound, (B) a vinyl polymer containing a siloxy group of the formula:

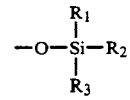

wherein $R_1$, $R_2$ and $R_3$ are the same or different and are each a lower ($C_1$–$C_4$) alkyl or phenyl, in the molecule and having a number average molecular weight of 3,000 to 30,000, and (C) a partially inactivated solid polyisocyanate compound wherein 0.2 to 10 % by weight of the isocyanate group (NCO) of a solid polyisocyanate is inactivated by reacting it with an inactivating agent.

The urethane prepolymer (A) used in this invention is prepared by reacting a polyol and an excess amount of a polyisocyanate compound.

The polyol includes polyalkylene ether polyols, polyester polyols, polycarbonate diols, polylactone polyols, polytetramethylene glycols, and the like, which are difunctional or trifunctional. Particularly preferred polyols are polyalkylene ether triols having a number average molecular weight of 5,000 to 30,000, in view of the storage stability and non-foaming properties.

The polyisocyanate compound includes aromatic polyisocyanate compounds such as 2,4- or 2,6-tolylenediisocyanate, 4,4'-diphenylmethanediisocyanate, 1,5-naphthalenediisocyanate, xylylenediisocyanate, and the like; aliphatic polyisocyanate compounds such as tetramethylene diisocyanate, hexamethylene diisocyanate, trimethylhexane diisocyanate, and the like; alicyclic polyisocyanate compounds such as isophorone diisocyanate, methylcyclohexane-2,4-(or 2,6-)diisocyanate, 4,4'-methylenebis(cyclohexyl isocyanate), 1,3-di(isocyanate-methyl)cyclohexane, and the like. Particularly preferred ones are aromatic polyisocyanate compounds in view of the foam-inhibiting properties and maintenance of physical properties.

The reaction of the polyol and the polyisocyanate compound is carried out under usual conditions, for example, at 50° to 90° C. for 0.5 to 5 hours, optionally in the presence of a reaction promoting catalyst such as dibutyl tin dilaurate, dibutyl tin maleate, stannous octate, lead octenate, tertiary amine compounds, and the like, to give a urethane prepolymer having an NCO content of 1 to 6 % by weight, preferably 2 to 4 % by weight. When the NCO content of the urethane prepolymer is less than 1 %, the composition of the invention has less storage stability (increase of viscosity or occurrence of gelation), and on the other hand, when the NCO content is more than 6 %, the product shows significant foaming due to reaction with moisture contained in the composition.

The vinyl polymer (B) containing the siloxy group of the formula as shown hereinbefore in the molecule is prepared, for example, by polymerizing a siloxy group-containing vinyl monomer alone or together with a copolymerizable monomer in a solvent such as an aromatic solvent (e.g. toluene, xylene, etc.), an acetate solvent (e.g. ethyl acetate, butyl acetate, cellosolve acetate, etc.), a ketone solvent (e.g. methyl ethyl ketone, methyl isobutyl ketone, etc.), in the presence of a radical polymerization initiator (e.g. azobisisobutyronitrile, di-t-butyl peroxide, benzoyl peroxide, etc.). The vinyl polymer containing a siloxy group usually has a number average molecular weight ($\overline{Mn}$) of 3,000 to 30,000. When the $\overline{Mn}$ is less than 3,000, the final sealant has insufficient physical properties, and on the other hand, when it is over 30,000, the vinyl polymer has less compatibility with the urethane prepolymer (A) and further has less storage stability.

The siloxy group-containing vinyl monomer used in the above reaction includes, for example, trimethylsiloxyethyl acrylate or methacrylate (the acrylate or methacrylate being hereinafter referred to in the form of abbreviated expression as "(meth)acrylate"), trimethylsiloxypropyl (meth)acrylate, trimethylsiloxybutyl (meth)acrylate, triethylsiloxyethyl (meth)acrylate, tributylsiloxypropyl (meth)acrylate, triphenylsiloxyalkyl (meth)acrylate, and the like.

The copolymerizable monomer includes, for example, an ester of (meth)acrylic acid with an alkyl having 1 to 22 carbon atoms, styrene, vinyltoluene, t-butylstyrene, α-methylstyrene, glycidyl (meth)acrylate, 2-ethoxyethyl (meth)acrylate, (meth)acrylonitrile, cyclohexyl (meth)-acrylate, unsaturated carboxylic acids (e.g. (meth)acrylic acid, maleic acid, fumaric acid, itaconic acid, etc.), diesters of maleic acid or fumaric acid, (meth)acrylamide, N-alkoxymethylated (meth)acrylamides, N,N-dialkylaminoalkyl (meth)acrylates, phosphate group-containing (meth)acrylates, vinyl acetate, hexafluoropropylene, tetrafluoroethylene, and the like.

Some of the vinyl polymer containing a siloxy group are commercially available, for example, "Acrydic HZ" manufactured by Dainippon Ink K. K., Japan.

In the one-pack type heat precurable moisture-curing sealant composition of this invention, the siloxy group contained in the vinyl polymer (B) is hydrolyzed with moisture in air to produce a hydroxy (OH) group which reacts with the active free isocyanate group of the partially inactivated solid polyisocyanate compound (C) under heating and further with the active free isocyanate group of the urethane prepolymer (A), by which the composition is cured. In this viewpoint, the urethane prepolymer (A) and the vinyl polymer containing a siloxy group (B) are incorporated in a molar ratio of NCO/OH of 0.5 to 10, preferably 1 to 3.

The partially inactivated solid polyisocyanate compound (C) used in this invention is prepared by reacting a solid polyisocyanate compound with an inactivating agent so that 0.2 to 10 % by weight, preferably 0.5 to 5 % by weight, of the NCO groups in the polyisocyanate compound are inactivated. When the inactivation is a degree of less than 0.2 % by weight, the composition of this invention has inferior storage stability which causes increase of viscosity and gelation of the composition, and on the other hand, when the degree of the inactivation is over 10 % by weight, the composition does not have the desired initial adhesive strength. The inactivation reaction is usually carried out at a temperature of 40° to 60° C. for 0.5 to 3 hours.

The above solid polyisocyanate compound denotes a polyisocyanate compound having a melting point of 40° C. or higher, preferably 80° C. or higher, for example, 1,5-naphthalene diisocyanate, dimer of 4,4'-diphenylmethane diisocyanate, dimer of 2,4-tolylene diisocyanate, 3,3'-diisocyanato-4,4'-dimethyl-N,N'-diphenylurea, N,N'-bis[4-(4-or 2-isocyanatophenylmethyl)phenyl]urea, and the like, among which dimer of 2,4-tolylene diisocyanate is particularly preferred.

The inactivating agent used above includes, for example, aliphatic polyamines (e.g. ethylenediamine, 1-amino-3,3,5-trimethyl-5-aminomethylcyclohexane, 3,3'-dimethyl-4,4'-diaminodicyclohexylmethane, diethylenetriamine, methylnonadiamine, etc.); hydrazine compounds (e.g. hydrazine hydrate, methylhydrazine, ethylhydrazine, hydroxyethylhydrazine, N,N'-dimethylhydrazine, etc.); hydrazide compounds (e.g. carbohydrazide, ethylene biscarbazate, β-semicarbazidopropionic acid hydrazide, isophorone-bis-semicarbazide, etc.); guanidine compounds (e.g. tetramethylguanidine, pentamethylguanidine, etc.); amidine compounds (e.g. 1,2-dimethyltetrahydropyrimidine, 1,8-diazabicyclo[5.4.0]undec-7-ene, 1,5-diazabicyclo[4.3.0]non-5-ene, etc.); and the like, among which 3,3'-dimethyl-4,4'-diaminodicyclohexylmethane is particularly preferred.

When the partially inactivated solid polyisocyanate compound (C) is heated at a temperature of 80° to 100° C., the remaining isocyanate groups are activated and then participate in the reaction with the hydroxy group (OH) produced by the hydrolysis of the vinyl polymer (B). In this viewpoint, the vinyl polymer containing a siloxy group (B) and the partially inactivated solid polyisocyanate compound (C) are incorporated in a molar ratio of NCO/OH of 0.5 to 2.

The heat precurable moisture-curing sealant composition of this invention comprises the urethane prepolymer (A), the vinyl polymer containing a siloxy group (B) and the partially inactivated solid polyisocyanate compound (C), and optionally other additives. The other additives include, for example, a filler such as carbon black (e.g. Ferness Black, Thermal Black, etc.), silicic anhydride, calcium carbonate, calcium carbonate surfacetreated with a fatty acid, clay, talc, and the like, which are previously dried to a water content of 0.05 % by weight or lower; a plasticizer such as phthalates (e.g. di-2-ethylhexyl phthalate, diundecyl phthalate, butyl benzyl phthalate, etc.), trimellitates (e.g. 2-ethylhexyl trimellitate, etc.), dicarboxylates (e.g. dioctyl adipate, dioctyl sebacate, dioctyl azelate, etc.), and the like, which have each a water content of 0.05 % by weight or lower; viscosity controlling solvents, thixotropic agents, ultraviolet absorbers, antioxidants, dyes and pigments, tackifiers (e.g. silane coupling agents), and the like. These other additives may usually be incorporated in an amount of 0.1 to 2.0 parts by weight to 100 parts by weight of the composition.

Moreover, in order to promote the above hydrolysis of the vinyl polymer containing a siloxy group (B), there may be added other additives such as acidic catalysts (e.g. phosphoric acid, phosphate, phosphite, phosphate containing an unsaturated group, p-toluenesulfonic acid or an amine salt thereof, benzoic acid, trichloroacetic acid, trifluoroacetic acid, naphthalenedisulfonic acid or an amine salt thereof, etc.), amines (e.g. ethylenediamine, N-β-aminoethyl-γ-aminopropyltrimethoxysilane, butylamine, dibutylamine, t-butylamine, hexylamine, triethylamine, etc.), alkyl titanates or octylates, carboxylic acid metal salts (e.g. dibutyl tin dilaurate, lead octylate, etc.), sulfides (e.g. monobutyl tin sulfide, dioctyl tin mercaptide, etc.), mercaptide type organic tin compounds, tetraethylammonium fluoride, cesium fluoride, and the like. The additive is usually added in an amount of 0.01 to 2.0 parts by weight, preferably 0.1 to 0.5 parts by weight, to 100 parts by weight of the vinyl polymer containing a siloxy group.

Additionally, in order to improve the storage stability of the composition, there may also be incorporated therein an appropriate amount of a conventional moisture adsorber, for example, trialkyl orthoformates (e.g. trimethyl orthoformate, triethyl orthoformate, tributyl orthoformate, etc.), trialkyl orthoacetates (e.g. trimethyl orthoacetate, triethyl orthoacetate, tributyl orthoacetate, etc.), trialkyl orthoborates (e.g. tributyl orthoborate, triethyl orthoborate, etc.), tetra-alkyl (or substituted alkyl) silicates (e.g. tetramethyl silicate, tetraethyl silicate, tetrabutyl silicate, tetra(2-methoxyethyl) silicate, tetra(2-chloroethyl) silicate, etc.), tetraphenyl silicate, tetrabenzyl silicate, di-, tri-, tetra- or hexa-mer of tetraethyl silicate, or hydrolyzable esters of these silicates, isocyanate group-containing compounds (e.g. phenylisocyanate, p-chlorophenylisocyanate, benzenesulfenylisocyanate, p-toluenesulfonylisocyanate, isocyanatoethyl methacrylate, etc.), and the like.

The composition of this invention having the above-mentioned components, i.e. comprising a urethane prepolymer (A), a vinyl polymer containing a hydrolyzable siloxy group (B) and a partially inactivated solid polyisocyanate compound (C), can exhibit the desired initial adhesive strength by the partial curation in the presence of moisture in air and by heating at a comparatively low temperature such as 80° to 100° C. for 5 to 10 minutes. This is due to the reaction of the siloxy group-containing vinyl polymer (B)/the partially inactivated solid polyisocyanate compound (C), and the reaction of the siloxy group-containing vinyl polymer (B)/the urethane prepolymer (a). Also, the composition can be cured wholly by the reaction with moisture at a room temperature, and hence, the curing step is well rationalized.

This invention is illustrated by the following Example and Reference Examples, but should not be construed to be limited thereto.

EXAMPLE 1

(1) Preparation of a Urethane Prepolymer

Polyoxypropylene-ethylene-triol having a molecular weight of 12,000 (3,000 g) is added to a reaction vessel which is purged with nitrogen gas, and is dried under vacuum (lower than 10 mmHg). After confirming that the compound has a water content of less than 0.05 %, diphenylmethane-4,4'-diisocyanate (312 g) is added thereto, and the mixture is reacted at a temperature of 80°±5° C. under vacuum for 5 hours. After the reaction, the reaction mixture is cooled to give a urethane prepolymer having an NCO content of 2.2 % and a viscosity of 36,000 cps/20° C.

(2) Preparation of a Sealant Composition

A dimer of 2,4-tolylenediisocyanate (melting point 145° C., 125 g) and 4,4'-diamino-3,3'-dimethyldicyclohexyl-methane (1.7 g) are reacted in the presence of $(CH_3)_3$—Si—O—group-containing vinyl polymer (Acrydic HZ-593, a number average molecular weight: 6,000, OH value: 36, manufactured by Dainippon Ink K. K.) (900 g) at 50° C. for 2 hours, by which the polyisocyanate compound is inactivated (1.9 % by weight of the NCO is inactivated). The resultant reaction mixture is added to the urethane prepolymer obtained in the above (1) (450 g) [in the urethane prepolymer and vinyl polymer, NCO/OH=4.24; and in the solid polyisocyanate compound and the vinyl polymer, the NCO/OH=1.39], and the mixture is stirred under nitrogen gas to dissolve well both components, and thereto is added dehydrated di(2-ethylhexyl) phthalate (200 g). After stirring the mixture for 10 minutes, dried carbon black (600 g) and dried calcium carbonate (300 g) are gradually added to the mixture. After completion of the addition, the mixture is degased by stirring under vacuum (lower than 10 mmHg) for 20 minutes, and thereto are added xylene (70 g, for controlling the viscosity) and lead octylate (10 g, for promoting the hydrolysis and also curing reaction of urethane), and the mixture is stirred under vacuum for 10 minutes. The sealant composition thus prepared is packaged in a sealed aluminum cartridge.

REFERENCE EXAMPLE 1

In the same manner as described in Example 1/(2), except that a vinyl polymer containing no siloxy group, i.e. an acrylpolyol (Acrydic Cu-1206, OH value: 30, manufactured by Dainippon Ink K. K.) (100 g), is used instead of the $(CH_3)_3$—Si—O—group-containing vinyl polymer (Acrydic HZ-593) (232 g), there is prepared a sealant composition.

Reference Example 2

In the same manner as described in Example 1/(2), except that the $(CH_3)_3$—Si—O—group-containing vinyl polymer (Acrydic HZ-593, 232 g) is omitted, there is prepared a sealant composition.

EXPERIMENT

The sealant compositions prepared in Example 1 and Reference Examples 1 and 2 were subjected to the following tests for studying the properties thereof. The results are shown in Table 1.

(1) Curability with Heat (Adhesion)

As the substrates to be adhered (width 25 mm), there were employed a glass plate treated with a primer (Primer 435-40, manufactured by Sunstar Giken K. K.) and a coated steel panel which was treated with a primer (Primer 435-95, manufactured by the same company as above). The sealant composition to be tested was applied to these substrates in a length of 10 mm, width of 25 mm and thickness of 5 mm, and the substrates were laminated to each other and then precured by heating at 80° C. for 5 minutes or at 100° C. for 10 minutes. Thereafter, the laminated substrates were subjected to a test of adhesive strength under shear (kg/cm$^2$), and the adhesive strength was evaluated by the following criteria:

Δ: Partially cured (adhesive strength under shear: 0.8-1.5 kg/cm$^2$),

Δ-o: Adhesive strength under shear: 2.0-3.0 kg/cm$^2$, o: Completely cured (adhesive strength under shear: more than 5 mg/cm$^2$).

By the way, the sealant composition prepared in Reference Example 2 was uncured under the above heating conditions.

(2) Storage Stability

The sealant composition to be tested was kept in a sealed vessel at a temperature of 40° C. for one to three weeks or at 50° C. for two weeks, and thereafter, the state of the composition was observed and evaluated as follows:

o: Good (the rate of change of viscosity is less than 10 %), x: Gelation.

TABLE 1

| | Example No. 1 | Reference Example No. 1 | Reference Example No. 2 |
|---|---|---|---|
| (1) Curability with heat | | | |
| 80° C. × 10 min. | Δ (1.0 kg/cm$^2$) | o | Not cured (0.1 kg/cm$^2$) |
| 100° C. × 5 min. | Δ - o (2.3 kg/cm$^2$) | o | Not cured (0.1 kg/cm$^2$) |
| (2) Storage stability | | | |
| 40° C. × 1 week | o | x | o |
| 40° C. × 2 weeks | o | x | o |
| 40° C. × 3 weeks | o | x | o |
| 50° C. × 2 weeks | o | x | o |

What is claimed is:

1. A one-pack type heat precurable moisture-curing sealant composition which comprises as the main component:

(A) a urethane prepolymer having a content of an active free isocyanate group (NCO) of 1 to 6 % by weight which is prepared by reacting a polyol and an excess amount of a polyisocyanate compound, (B) a vinyl polymer containing a siloxy group of the formula:

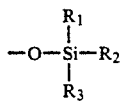

wherein R$_1$, R$_2$ and R$_3$ are the same or different and are each a C$_1$-C$_4$ alkyl or phenyl, in the molecule and having a number average molecular weight of 3,000 to 30,000, and (C) a partially inactivated solid polyisocyanate compound which is prepared by inactivating 0.2 to 10 % by weight of the isocyanate groups by reacting a solid polyisocyanate compound with an inactivating agent.

2. The composition according to claim 1, wherein the vinyl polymer containing a siloxy group (B) is incorporated in a molar ratio of the hydroxy group (OH) produced by the hydrolysis of the vinyl polymer and the active free isocyanate group of the urethane prepolymer (A) (NCO/OH) of 0.5 to 10.

3. The composition according to claim 1, wherein the partially inactivated solid polyisocyanate compound (C) is incorporated in a molar ratio of the isocyanate group (NCO) after heat-activating the polyisocyanate compound to the hydroxy group (OH) produced by the hydrolysis of the vinyl polymer containing a siloxy group (B) (NCO/OH) of 0.5 to 2.

4. The composition according to claim 1, wherein said inactivating agent is a polyamine, a hydrazine compound, a hydrazide compound, a guanidine compound, or an amidine compound.

5. The composition according to claim 4, wherein the polyamine is selected from the group consisting of ethylenediamine, 1-amino-3,3,5-trimethyl-5-aminomethylcyclohexane, 3,3'-dimethyl-4,4'-diaminodicyclohexylmethane, diethylene-triamine, and methylnonadiamine.

6. The composition according to claim 4, wherein said hydrazine compound is selected from the group consisting of hydrazine hydrate, methylhydrazine, ethylhydrazine, hydroxyethylhydrazine, and N,N'-dimethylhydrazine.

7. The composition according to claim 4, wherein said hydrazide compound is selected from the group consisting of carbohydrazide, ethylene biscarbazate, β-semicarbazidopropionic acid hydrazide, and isophorone-bis-semicarbazide.

8. The composition according to claim 4, wherein said guanidine compound is selected from the group consisting of tetramethylguanidine and pentamethylguanidine.

9. The composition according to claim 4, wherein said amidine compound is selected from the group consisting of1,2-dimethyltetrahydropyrimidine, 1,8-diazabicyclo undec-7-ene, and 1,5-diazabicyclo non-5-ene.

10. The composition according to claim 1, wherein said polyol is selected from the group consisting of polyalkylene ether polyols, polyester polyols, polycarbonate diols, polylactone polyols, polytetramethylene glycols.

11. The composition according to claim 10, wherein said polyols are polyalkylene ether triols having a number average molecular weight of 5,000 to 30,000.

12. The composition according to claim 1, wherein said polyisocyanate compound is an aromatic polyisocyanate compound, an aliphatic polyisocyanate compound, or an alicyclic polyisocyanate compound.

13. The composition according to claim 12, wherein said aromatic polyisocyanate compound is selected from the group consisting of 2,4- or 2,6-tolylenediisocyanate, 4,4'-diphenylmethanediisocyanate, 1,5-naphthalenediisocyanate, and xylylenediisocyanate.

14. The composition according to claim 12, wherein said aliphatic polyisocyanate compound is selected from the group consisting of tetramethylene diisocyanate, hexamethylene diisocyanate, and trimethylhexane diisocyanate.

15. The composition according to claim 12, wherein said alicyclic polyisocyanate compound is selected from the group consisting of isophorone diisocyanate, methylcyclohexane-2,4-(or 2,6-)diisocyanate, 4,4'-methylenebis(cyclohexyl isocyanate), and 1,3-di(isocyanate-methyl)cyclohexane.

16. The composition according to claim 1, wherein said vinyl polymer containing a siloxy group is a homopolymer of a siloxy group-containing vinyl monomer.

17. The composition according to claim 16, wherein said siloxy group-containing vinyl monomer is selected from the group consisting of trimethylsiloxy-ethyl acrylate or methacrylate, trimethylsiloxypropyl (meth)acrylate, trimethylsiloxybutyl (meth)acrylate, triethylsiloxyethyl (meth)acrylate, tributylsiloxypropyl (meth)acrylate, and triphenylsiloxyalkyl (meth)acrylate.

18. The composition according to claim 1, wherein said vinyl polymer containing a siloxy group is a copolymer of a siloxy group-containing vinyl monomer selected from the group consisting of an ester of (meth)acrylic acid with an alkyl having 1 to 22 carbon atoms, styrene, vinyltoluene, t-butylstyrene, α-methylstyrene, glycidyl (meth)acrylate, 2-ethoxyethyl (meth)acrylate, (meth)acrylonitrile, cyclohexyl (meth)-acrylate, (meth)acrylic acid, maleic acid, fumaric acid, itaconic acid, diesters of maleic acid or fumaric acid, (meth)acrylamide, N-alkoxymethylated (meth)acrylamides, N,N-dialkylaminoalkyl (meth)acrylates, phosphate group-containing (meth)acrylates, vinyl acetate, hexafluoropropylene, and tetrafluoroethylene.

19. The composition according to claim 18, wherein said siloxy group-containing vinyl monomer is selected from the group consisting of trimethylsiloxy-ethyl acrylate or methacrylate, trimethylsiloxypropyl (meth)acrylate, trimethylsiloxybutyl (meth)acrylate, triethylsiloxyethyl (meth)acrylate, tributylsiloxypropyl (meth)acrylate, and triphenylsiloxyalkyl (meth)acrylate.

20. The composition according to claim 1, wherein said solid polyisocyanate compound is selected from the group consisting of 1,5-naphtalene diisocyanate, dimer of 4,4'-diphenylmethane diisocyanate, dimer of 2,4-tolylene diisocyanate, 3,3'-diisocyanato- 4,4'-dimethyl-N,N'-diphenylurea, and N,N'-bis[4-(4- or 2-isocyanatophenylmethyl)phenyl]urea.

* * * * *